T. S. BARBOUR.
HAY FORK ATTACHMENT.
APPLICATION FILED APR. 20, 1909.
970,415.
Patented Sept. 13, 1910.
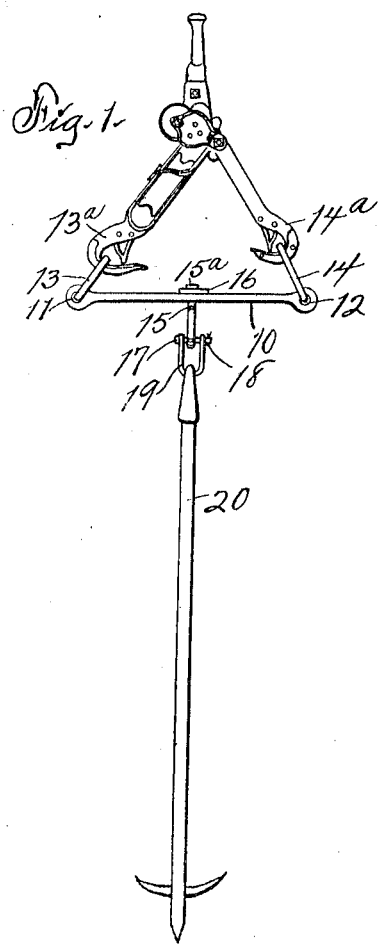
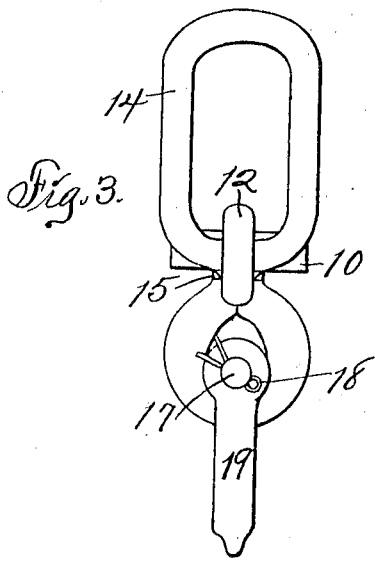
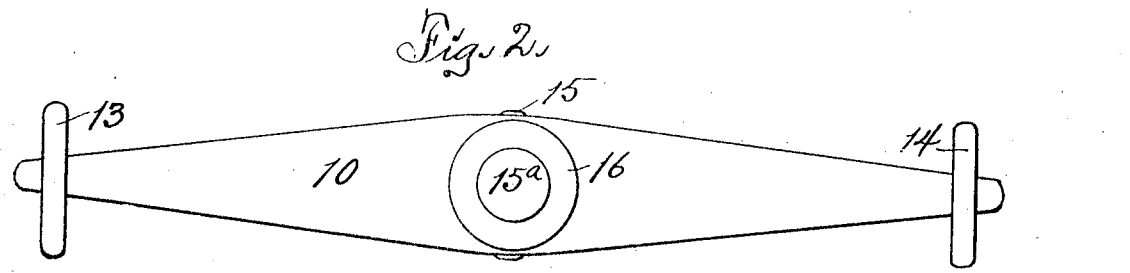
Attest:
Erle W. Miller
F. O. Woodard
Inventor:
Thomas S. Barbour,
By J. C. Sweet Atty

UNITED STATES PATENT OFFICE.

THOMAS S. BARBOUR, OF AMES, IOWA.

HAY-FORK ATTACHMENT.

970,415.  Specification of Letters Patent.  Patented Sept. 13, 1910.

Application filed April 20, 1909. Serial No. 491,639.

*To all whom it may concern:*

Be it known that I, THOMAS S. BARBOUR, a citizen of the United States of America, and resident of Ames, Story county, Iowa, have invented a new and useful Hay-Fork Attachment, of which the following is a specification.

The object of this invention is to provide means for interchangeably using a hay fork and slings in unloading and stacking or mowing-away hay.

A further object of this invention is to provide means for supporting a hay fork to sling pulleys, which means can be detached from the sling pulleys conveniently and readily.

My invention consists in the construction, arrangement and combination of elements hereinafter set forth, pointed out in my claim and illustrated by the accompanying drawing, in which—

Figure 1 is a front elevation illustrating my improved device attached to hay sling pulleys and supporting a fork. Fig. 2 is a plan and Fig. 3 an end view of my attachment detached from fork and sling pulleys.

In the construction of the device as shown the numeral 10 designates a metal bar preferably wider at its center than at its ends and formed with a hole in its center perpendicular to its bottom and eyes 11, 12 transversely of its ends. Rings 13, 14 are mounted in the eyes 11, 12 and are adapted for attachment to hooks 13ª, 14ª of hay slings of any desired form. An eyebolt 15 is swiveled in the hole in the center of the bar 10 and is arranged with its eye extending downward from said bar. A head 15ª is formed on the eyebolt 15 above the bar 10 and a washer 16 is mounted on said bolt between said head and bar. A clevis pin 17, provided with a key 18, is mounted in the eye of the bolt 15 and a clevis 19 of common form is suspended thereon. A hay-fork 20 of any desired form can be mounted to the bar 10 by suspending it in the clevis 19. In Fig. 1 I show hay-fork 20 of one form carried by the clevis 19 and the bar 10 carried by the hooks of slings of common form. The bar 10, carrying the fork 20, can be used on the sling pulleys, or the slings can be used alone.

In the practical operation of stacking or mowing away along hay, it is convenient and expeditious to remove approximately two-thirds of a load from a wagon by the use of a fork and then remove the fork and bar from the sling pulleys and complete unloading the wagon by use of the slings alone. My improvement makes convenient and possible the use of fork or slings interchangeably on the same hay sling pulley devices.

I claim as my invention—

In combination with the hooks of a hay sling, an atachment whereby said hooks are spread and rigidly secured to support a fork of greater capacity than the sling, said spreading and securing means comprising a bar of a length to span said hooks when the latter are spaced and having swiveled links at its ends to engage said hooks and an intermediate depending axially swiveled clevis adapted to receive a depended hay fork.

Signed by me at Ames, Iowa, this 17th day of September, 1908.

THOMAS S. BARBOUR.

Witnesses:
CLYDE L. SIVERLY,
C. H. PASLEY.